Oct. 13, 1942.   A. W. MEYER   2,298,579
ABSORPTIVE FORM LINING
Filed Sept. 26, 1941
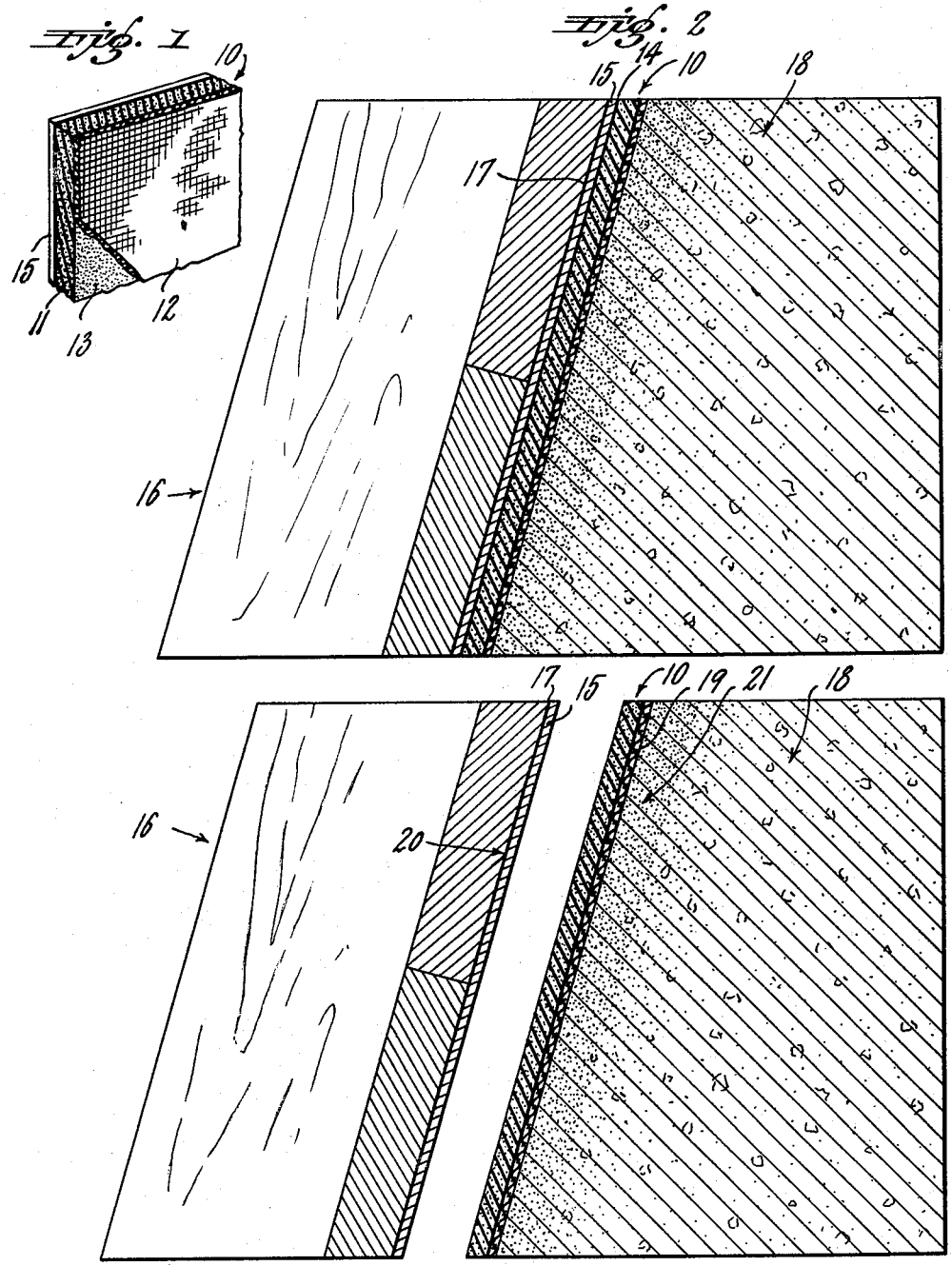
INVENTOR.
ALBERT WILLIAM MEYER
BY
ATTORNEY Patented Oct. 13, 1942

2,298,579

UNITED STATES PATENT OFFICE 2,298,579

ABSORPTIVE FORM LINING

Albert W. Meyer, Nutley, N. J., assignor to United States Rubber Company, New York, N. Y., a corporation of New Jersey Application September 26, 1941, Serial No. 412,351

12 Claims. (Cl. 25—122)

This invention relates to linings for forms used in the molding of concrete, cement and the like, especially to such linings as those exemplified in the co-pending application of Bender and Brooks, filed June 28, 1941, Serial No. 400,238, owned by the assignee of the present application, and more particularly the instant invention relates to improved backing elements for use between forms so used in the molding of concrete, etc. and linings of various types, including that disclosed in the above-mentioned application.

Among existing types of form-linings, certain linings of the fibre-board type require nails for mounting them on the forms, and are difficult to remove from the concrete masses which have been poured against them, because there is a tendency for their surfaces to bond to the concrete and leave small pieces of fiber embedded in the concrete surfaces. These embedded fibers detract from the appearance of the concrete and impair its resistance to abrasion.

Such types of lining accordingly, while relatively inexpensive, are characterized by a low delaminating strength which off-sets their low cost, and in the attempts made to improve the stripping property of such linings, other workers in this field have directed their efforts toward the utilization of materials having a higher delaminating strength, with results that are satisfactory commercially, even considering the increased cost.

For example, in the novel type of lining forming the subject of the above-mentioned application, Serial No. 400,238, one embodiment includes a backing layer of high wet strength. This lining strips readily and in a clean manner.

Similarly, in another instance (see U. S. Patent 2,024,727) the lining disclosed comprises a layer of paper felt plus a coating of asphalt plus a backing of kraft paper over the asphalt, and in this lining the asphalt is impervious to water.

A further expedient, designed to aid in easy stripping of a used lining from the form, comprises the application to the form of a sealing coat of paint or lacquer.

The general object of the present invention is to provide an improved lining of the type disclosed in application of Brooks and Bender, Serial No. 400,238, which will be applicable to forms at relatively low cost, will permit desirably cleaner stripping from the forms than is usual with chipboard of low cost, and will make possible easier re-use of the forms.

Ancillary to the above general object, it is an object of the invention to provide an absorptive lining making it possible to use the relatively less costly material having lower delaminating strengths, and still obtain the desirable stripping characteristics heretofore thought to be obtainable only with materials having relatively high delaminating characteristics.

Another object of the invention is to provide a backing layer bonded to the absorbent layer of the lining by an adhesive which, when softened by water from the concrete mix, causes the bond between the backing layer and absorptive layer to be so loosened that when the form is stripped the backing sheet parts from the remainder of the lining and remains adhered to the form.

Still another object of the invention is to provide a backing layer for the absorptive lining of such a nature that it can be left upon the form when so stripped, and thus make it possible, when the form is re-used to employ a new absorptive lining bonded suitably to the backing left upon the form.

Other features and objects of the invention will appear as progress is made in the description of the embodiment of the invention selected for illustration in the drawing, in which:

Fig. 1 is an isometric view in detail of part of an absorptive form lining in the construction of which the present invention has been embodied;

Fig. 2 is a view in vertical section of part of the spillway of a dam in which an absorptive lining of the nature of that shown in Fig. 1 has been used; and Fig. 3 is a similar view illustrating the mode of stripping the mold form from the completed face of the spillway, the absorbent lining still remaining in place, while the backing layer has parted therefrom and adheres to the face of the form.

Referring now to the drawing in detail, the part designated in general by the reference character 10 is a fragment of absorbent form lining, which may be of any suitable composition, and which, in the instance illustrated, follows in general the disclosure contained in the aforesaid co-pending application, Serial No. 400,238, in the respect that it comprises a highly absorbent layer 11 of porous material, such as chipboard, and a facing layer 12 of porous sheet material, non-adherent to cement but pervious to water, such as a textile fabric, for example a finely woven cloth like muslin or silk, or a more coarsely woven cloth like leno-weave or burlap, according to the surface to be produced on the face molded of the concrete or cement mass, the facing layer 12 being bonded to the absorbent layer 11 by a suitable water-insoluble adhesive medium 13, so applied as to be pervious to water derived through the facing layer 12 from the concrete when the latter has been poured against the form thus lined as shown in Fig. 2.

A suitable adhesive for the purpose is one of those exemplified in the aforesaid application Serial No. 400,238; such as an in situ deposited latex from a dispersion thereof, which may be sprayed on as set forth more in detail in said application.

In pursuance of the present invention, provision is made of a backing layer 15 composed of a porous fibrous sheet material, which may have the low wet strength which characterizes a pulpy paper such as newsprint stock, and in fact newsprint stock adhered by a water softening adhesive 14 to the lining has been found satisfactory for the intended use.

The form lining thus constituted may be adhered to the form 16 by any suitable adhesive, as 17, such as a pressure-sensitive adhesive, which may be sprayed or painted on the form or on the lining. After the concrete 18 has been poured and allowed to harden, and the form is stripped therefrom, the backing sheet 15 remains attached to the face 20 of the form, but the rest of the form lining 10 strips cleanly from the form, as illustrated in Fig. 3, and may thereafter be stripped cleanly from the face 19 of the concrete, the latter presenting a surface free from voids, with a case-hardened zone 21.

Accordingly, it is unnecessary, under ordinary conditions, to further clean the form, since subsequent linings, as 10, may be adhered over the backing sheet 15 shown in Fig. 3, preparatory to re-use of the form.

*Example*

An absorbent form lining (like 10, Fig. 1) was prepared, comprising a facing 12 made of 80 x 80 count muslin sheeting which had been de-sized, boiled-off and adhered by the latex spray method to give a permeable bond 13 to the body layer 11, which was constituted by a highly absorbent chipboard .060 of an inch thick, weighing .2 of a pound per square foot, and with a backing sheet 15 of .002 of an inch thick newspaper stock, bonded to the back of the chipboard with a dextrine adhesive (converted tapioca).

A portion of this form lining was attached, as in Fig. 2, to the inner face 20 of the conventional form lining 16 by spraying the face of the form with an aqueous dispersion 17 of a mixture of reclaimed rubber and cumaron resin, and then rolling the lining down on the face of the form. A retaining wall was made by casting against the form thus lined a conventional concrete mix 18 containing the usual proportions of Portland cement, sand, coarse aggregate and water. The wet concrete was vibrated in the usual manner while the form was being filled.

When the forms were removed, as in Fig. 3, after the concrete had undergone the necessary curing, the lining 10 stripped entirely clean from the newspaper backing 15, which remained bonded to the form 16. The rest of the lining 10 was attached loosely to the face 19 of the concrete, from which it was easily stripped clean, leaving the concrete free from adhesions.

The newspaper 15 was so thin that it was left on the form so that new absorptive lining could be bonded by reclaimed rubber-cumaron resin dispersion over the newspaper the next time the form was used.

The concrete surface 19 cast against the lining was predominantly void-free, lacking any substantial pits, and had an even texture corresponding to the texture of the muslin facing. The surface zone 21 was also found to have undergone a desirable "case-hardening" in that it was denser and more resistant to abrasion than was a surface cast against a wooden form alone.

In practice, I can use as a backing sheet other materials than newsprint paper, such as kraft, waxed or asphalted kraft, tissue, book paper, fabric, Cellophane and the like, as strength of the backing sheet is not an important factor, since practically no load carrying capacity is required. The backing sheet should preferably be thin, say .002 of an inch or less.

The adhesive for bonding the backing sheet to the chipboard or other absorbent layer should be one which is softened by water derived from the concrete mix so as to loosen the bond between the backing sheet and the absorbent layer as above described, such as dextrine, flour or starch paste, glue, casein, and the like. It may be noted that the form lining as described in Example 1 of the above mentioned application, Serial No. 400,238, may be attached to the wood form by means of the above cited adhesives which are to be softened by water from the concrete mix. Such adhesives, however, are frequently difficult to use in the field especially when the wood forms are wet or when the atmosphere is very humid, and it is more convenient, under such conditions, to apply the adhesive in the factory and have the backing sheet to protect against wet forms or high humidity.

The adhesive used for bonding the form lining to the form should not be softened by water. It is not necessary to apply the adhesive to both the form and the lining, but this is also a feasible procedure. In order to avoid the need for applying adhesive in the field, a water-insoluble, pressure-sensitive adhesive may be applied to the newspaper sheet as one step in the fabrication of my improved lining, forming the adhesive layer 17 as a unitary structure with the components of the lining 10 shown in Fig. 1.

From the foregoing disclosure, it will be clear that I have provided for carrying into effect the objects of the invention as stated in the opening paragraphs of this specification particularly in the respects that while preserving the advantages of the form lining illustrated and described in the above-mentioned application Serial No. 400,238, and by avoiding the inconveniences of operation and disadvantages of greater cost incidental upon the use of the expedients of the prior art, I have made possible the utilization of lower cost materials and increased the convenience of installation, especially in the important matter of re-use of the forms.

Inasmuch as high delaminating strength is not required for the absorbent layer of the instant invention, I have broadened the range of absorbent materials which can be used, making it possible to utilize even the cheapest chipboard.

I further make it unnecessary to treat the wooden forms to reduce adhesion to the mounting adhesive by coating the wood with a layer of wax, paint or lacquer, as the invention contemplates leaving the backing upon the form when the latter is stripped, and the pressure-sensitive adhesive 12 suffices to secure the backing 15 to the form 16.

Another advantage is that the adhesive bond 17 which is used can be much stronger than that of latex to a waxed form, thus eliminating the change for loosening of the lining. Even exposure to spraying with a hose for fifteen minutes, followed by standing overnight, resulted in no loosening or wrinkling of the lining. The lining may, however, be protected against prolonged rainfall by covering the form with tarpaulin. Another way to protect the lining mounted on the form against moisture is to apply waterproof adhesive tape at the edges of the form-lining, or a temporary waterproof layer over the entire exposed surface.

Having thus described my invention, what I claim and desire to protect by Letters Patent is:

1. A form lining of the class described, comprising a layer of absorbent sheet material, a facing layer of material non-adhesive to cement secured to said absorbent layer by a layer of permeable, water-insoluble adhesive, and a backing sheet of fibrous sheet material adhered to said absorbent layer by a layer of adhesive adapted to be loosened by the action of water in said absorbent layer derived from the concrete.

2. A form lining of the class described, comprising a layer of absorbent sheet material, a facing layer of material non-adhesive to cement secured to said absorbent layer by a layer of permeable, water-insoluble adhesive, and a backing sheet of fibrous sheet material adhered to said absorbent layer by a layer of adhesive adapted to be loosened by the action of water in said absorbent layer derived from the concrete, and a layer of adhesive by which said lining is secured to the form.

3. A form lining of the class described, comprising a layer of absorbent sheet material, a facing layer of material non-adhesive to cement secured to said absorbent layer by a layer of permeable, water-insoluble adhesive, and a backing sheet of fibrous sheet material adhered to said absorbent layer by a layer of adhesive adapted to be loosened by the action of water in said absorbent layer derived from the concrete, and a layer of adhesive by which said lining is secured to the form, said last-named adhesive layer having greater resistance to stripping from the form and backing layer than the water-loosened adhesive layer has to stripping from said backing layer.

4. A form lining of the class described, comprising a layer of absorbent sheet material, a facing layer of material non-adhesive to cement secured to said absorbent layer by a layer of permeable, water-insoluble adhesive, and a backing sheet of fibrous sheet material adhered to said absorbent layer by a layer of adhesive adapted to be loosened by the action of water in said absorbent derived from the concrete, said backing sheet constituting with said facing layer, said absorbent layer and said adhesive layer a unitary structure adapted to be stored, transported and applied as such.

5. A form lining of the class described, comprising a layer of absorbent sheet material, a facing layer of material non-adhesive to cement secured to said absorbent layer by a layer of permeable, water-insoluble adhesive, and a backing sheet of fibrous sheet material adhered to said absorbent layer by a layer of adhesive adapted to be loosened by the action of water in said absorbent derived from the concrete, said backing sheet constituting, with said facing layer, said absorbent layer and said adhesive layer a unitary structure adapted to be stored, transported and applied as such, and an adhesive layer also included in said unitary structure and by which the lining structure may be secured to said form.

6. A form lining of the class described, comprising a layer of absorbent sheet material, a facing layer of material non-adhesive to cement secured to said absorbent layer by a layer of permeable, water-insoluble adhesive, and a backing sheet of fibrous sheet material adhered to said absorbent layer by a layer of adhesive adapted to be loosened by the action of water in said absorbent derived from the concrete, said backing sheet constituting, with said facing layer, said absorbent layer and said adhesive layers, a unitary structure adapted to be stored, transported and applied as such, and a pressure-sensitive adhesive layer also included in said unitary structure and by which the lining structure may be secured to said form.

7. A form lining of the class described, comprising a layer of absorbent sheet material, a facing layer of porous material non-adherent to cement secured to said absorbent layer by a layer of permeable, water-insoluble adhesive, and a backing sheet of pulpy, fibrous material adhered to said absorbent layer by a layer of adhesive adapted to be loosened by the action of water in said absorbent layer derived from the concrete.

8. A form lining of the class described, comprising a layer of absorbent sheet material, a facing layer of porous material non-adherent to cement secured to said absorbent layer by a layer of permeable, water-insoluble adhesive, and a backing sheet of pulpy, fibrous material of the nature of newsprint adhered to said absorbent layer by a layer of adhesive adapted to be loosened by the action of water in said absorbent layer derived from the concrete.

9. A form lining of the class described, comprising a layer of highly absorbent chipboard, a facing layer of muslin non-adherent to concrete secured to the chipboard by an adhesive layer of permeable in-situ-deposited latex, and a backing sheet of newsprint stock adhered to said absorbent layer by a layer of adhesive selected from the group consisting of dextrine, starch paste, flour paste and glue, adapted to be loosened by the action of water in said absorptive layer derived from the concrete.

10. A form lining of the class described, comprising layers of water permeable material, one of which layers is highly absorbent and another is non-adherent to cement, said layers being secured together by a water-insoluble, permeable adhesive, and a backing layer secured to said absorbent layer by a water-soluble adhesive, said backing layer being adapted to be adhered to said form and to remain attached thereto when said form is stripped from said lining after said water-soluble adhesive has been permeated and softened by water derived from the cement poured against said lining.

11. A form lining of the class described comprising a layer of absorbent sheet material, having a facing layer of porous textile material non-adherent to concrete and secured to said absorbent layer by a layer of permeable, water-insoluble adhesive, and a backing layer of sheet material adhered to said absorbent layer by an adhesive adapted to be loosened by the action of water in said absorptive layer derived from the concrete.

12. A form lining of the class described, comprising an absorbent layer, a facing layer non-adherent to concrete, said layers being secured together by a permeable layer of water-insoluble adhesive, a backing layer secured to said absorbent layer by a water-soluble adhesive, and a layer of water-insoluble adhesive by which said backing layer may be secured permanently to said form, whereby when said form is stripped from a mass of concrete poured against said facing layer, said backing layer is parted from said lining and retained upon said form, during subsequent reuse of the form.

ALBERT W. MEYER.